(12) United States Patent
Keith-Wolfe

(10) Patent No.: US 7,140,763 B1
(45) Date of Patent: Nov. 28, 2006

(54) LIGHT DISTRIBUTION SYSTEM

(76) Inventor: Carol I. Keith-Wolfe, 10130 Crocket Dr., Reno, NV (US) 89506

(*) Notice: Subject to any disclaimer, the term of this patent is extended or adjusted under 35 U.S.C. 154(b) by 217 days.

(21) Appl. No.: 10/772,273

(22) Filed: Feb. 6, 2004

(51) Int. Cl.
*F21V 7/00* (2006.01)

(52) U.S. Cl. .................. 362/628; 362/606; 362/127; 362/145

(58) Field of Classification Search ............... 362/330, 362/26, 606, 617, 551, 556, 559, 628, 511, 362/561, 576
See application file for complete search history.

(56) References Cited

U.S. PATENT DOCUMENTS

| | | | | |
|---|---|---|---|---|
| 3,761,704 A | * | 9/1973 | Takeichi et al. | 362/27 |
| 4,257,084 A | * | 3/1981 | Reynolds | 362/601 |
| 4,428,030 A | * | 1/1984 | Baliozian | 362/18 |
| 4,729,185 A | * | 3/1988 | Baba | 40/546 |
| 4,782,430 A | * | 11/1988 | Robbins et al. | 362/562 |
| 4,843,524 A | * | 6/1989 | Krent et al. | 362/127 |
| 5,013,109 A | * | 5/1991 | Zelan et al. | 385/115 |
| 5,101,325 A | * | 3/1992 | Davenport et al. | 362/628 |
| 5,488,696 A | * | 1/1996 | Brosnan | 385/129 |
| 6,082,886 A | * | 7/2000 | Stanford | 362/576 |

* cited by examiner

*Primary Examiner*—Renee Luebke
*Assistant Examiner*—Robert May
(74) *Attorney, Agent, or Firm*—Robert M. Sperry

(57) ABSTRACT

Improved light distribution means comprising light distribution means constructed of material such as plastic, transparent metals and the like, which is strong enough to be used as permanent or mobile structural components of buildings, sidewalks, streets and the like, and as signs, furniture and the like, and having a pair of lens panels formed with a flat front, light emitting surface and an inclined rear light reflecting surface, together with a light source located in a recess formed in the lens panels and serving to deliver light into said lens panels for distribution.

56 Claims, 4 Drawing Sheets

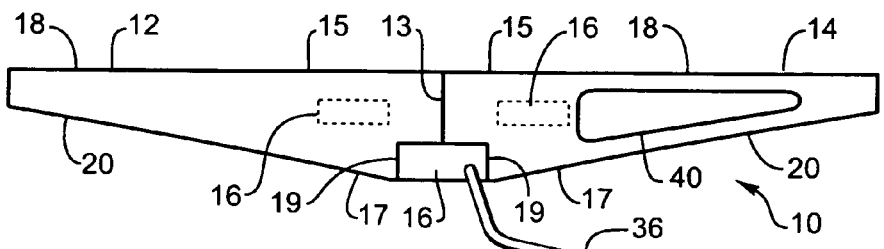
*Fig. 1*
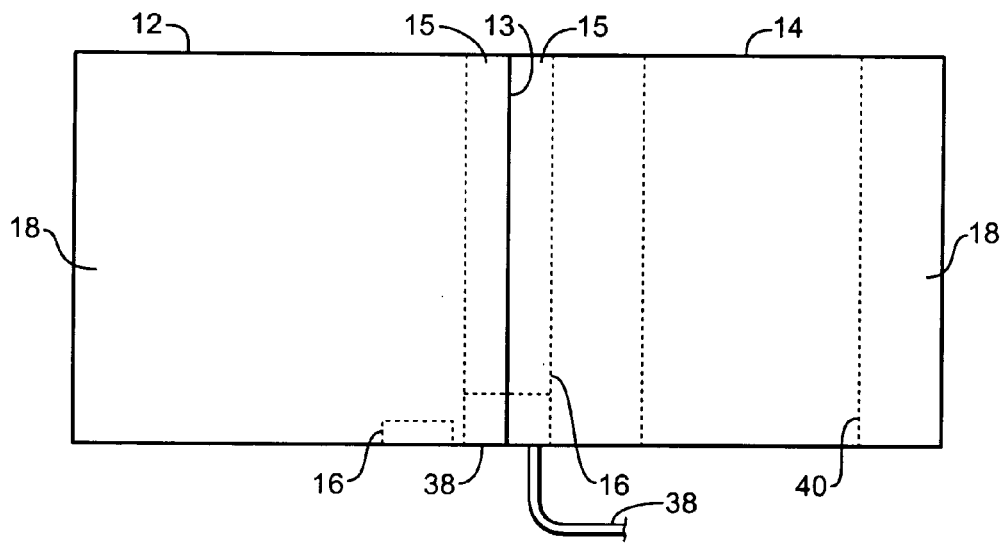
*Fig. 2*
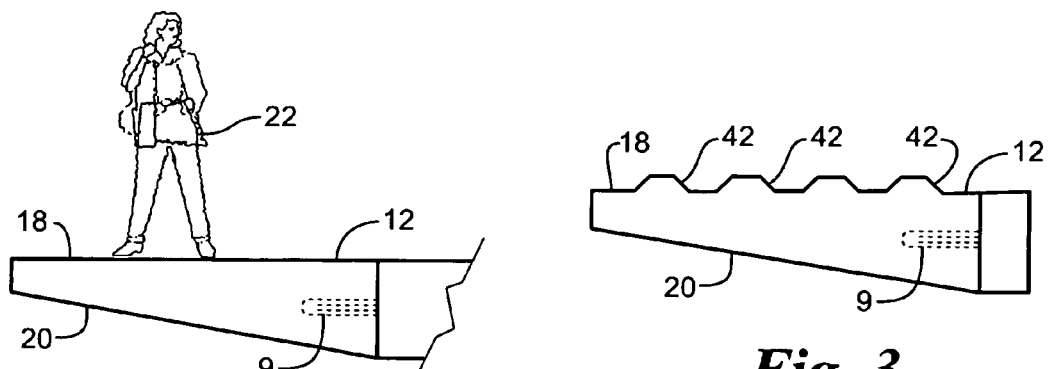
*Fig. 3A*
*Fig. 3*

LIGHT DISTRIBUTION SYSTEM

FIELD OF INVENTION

This invention relates to lighting systems and is particularly directed to improved systems for distributing light for a wide variety of purposes.

PRIOR ART

For hundreds of years, artificial and solar lighting systems have made our lives much more pleasant and productive. However, prior art light sources and solar light have been limited to point sources, such as flames or incandescent bulbs or to linear sources, such as flourescent bulbs, neon tubes, lasers and the like. Unfortunately all of these light sources are formed of relatively fragile materials. Also, artificial and solar light has been distributed primarily by radiation or, recently, by linear devices, such as optical fibers or wave guides, which are essentially one dimensional. Consequently, although prior art lighting systems have been extremely useful, This lack of a multi-dimensional distribution system has greatly limited the utility of artificial and solar lighting systems. Recently, electricity has greatly increased the usefulness of lighting systems. However, electricity can be extremely hazardous and even fatal, especially when used under water or in explosive atmospheres. Thus, none of the prior art lighting systems have been entirely satisfactory.

BRIEF SUMMARY AND OBJECTS OF INVENTION

These disadvantages of the prior art are overcome with the present invention and improved lighting systems are provided which employ light distribution means, having significant length and width, and formed of rugged materials which permit the use of the light distribution means as permanent and mobile structural components of architectural structures and infrastructure, such as buildings, sidewalks, streets and the like, and in signs, furniture and other uses which makes possible vastly new and different uses of lighting systems. Also, the present invention contemplates using flexible materials which can be bent around corners or coiled and the use of non-electric energy delivery means, such as light pipes, lasers and the like, which can safely be used under water or in explosive atmospheres.

These advantages of the present invention are preferably attained by providing an improved lighting system comprising light distribution means constructed of material, such as plastic, transparent metals and the like, which is strong enough to be used as permanent and mobile structural components of buildings, sidewalks, streets and the like, and in signs, furniture and the like, and having a pair of lens panels formed with a front, light emitting surface, which may be planar, convex, concave, faceted, embossed or otherwise surface decorated, and an inclined rear light reflecting surface, together with a light cartridge, insertable in said lens panels and serving to deliver light into said lens panels for even, glare-free distribution, together with energy delivery means which may be non-electric Accordingly, it is an object of the present invention to provide improved light distribution means.

Another object of the present invention is to provide light distribution means having significant length and width.

An additional object of the present invention is to provide light distribution means which can be made small enough to be employed as components of microsized instruments and the like.

A further object of the present invention is to provide light distribution means which can be employed as in-wall television and the like.

Another object of the present invention is to provide light distribution means which receives solar power and delivers some of the solar energy to light panels to create light, which may be filtered to enhance or remove infrared, and converts some of the solar energy to electrical energy which can be stored in batteries, fuel cells and the like and distributes the power through electrical or non-electrical means to energize desired electrical or lighting devices.

An additional object of the present invention is to provide improved light distribution means composed of materials which are strong enough to be used as permanent and mobile structural components of buildings, sidewalks, streets, signs, vehicles and the like, and of signs, furniture and the like.

A further object of the present invention is to provide improved planar light distribution means having vastly new uses.

Another object of the present invention is to provide an improved light distribution system including non-electric energy delivery means.

An additional object of the present invention is to provide an improved light distribution system which can be safely used under water or in explosive atmospheres.

A specific object of the present invention is to provide improved light distribution means comprising light distribution means constructed of material which is strong enough to be used a structural components of furniture, buildings, sidewalks, streets, signs, vehicles and the like, such as plastic, transparent metals and the like, and having a pair of lens panels formed with a front, light emitting surface, which may be planar, convex, concave, faceted, embossed or otherwise surface decorated, and an inclined rear light reflecting surface, together with a light cartridge insertable in said lens panels and serving to deliver light into said len panels for even, glare-free distribution, together with energy delivery means which may be non-electric.

These and other objects and features of the present invention will be apparent from the following detailed description, taken with reference to the figures of the accompanying drawing.

BRIEF DESCRIPTION OF THE DRAWING

FIG. 1 is an exploded view of a light distribution device embodying the present invention;

FIG. 2 is a transverse section through one of the lens panels of the light distribution device of FIG. 1, taken on the line 2—2 of FIG. 1;

FIG. 3 is side view of an alternative form of the lens panels of the light distribution device of FIG. 1;

FIG. 3A is a side view showing another alternative form of the lens panels

DETAILED DESCRIPTION OF THE INVENTION

Figure 5:
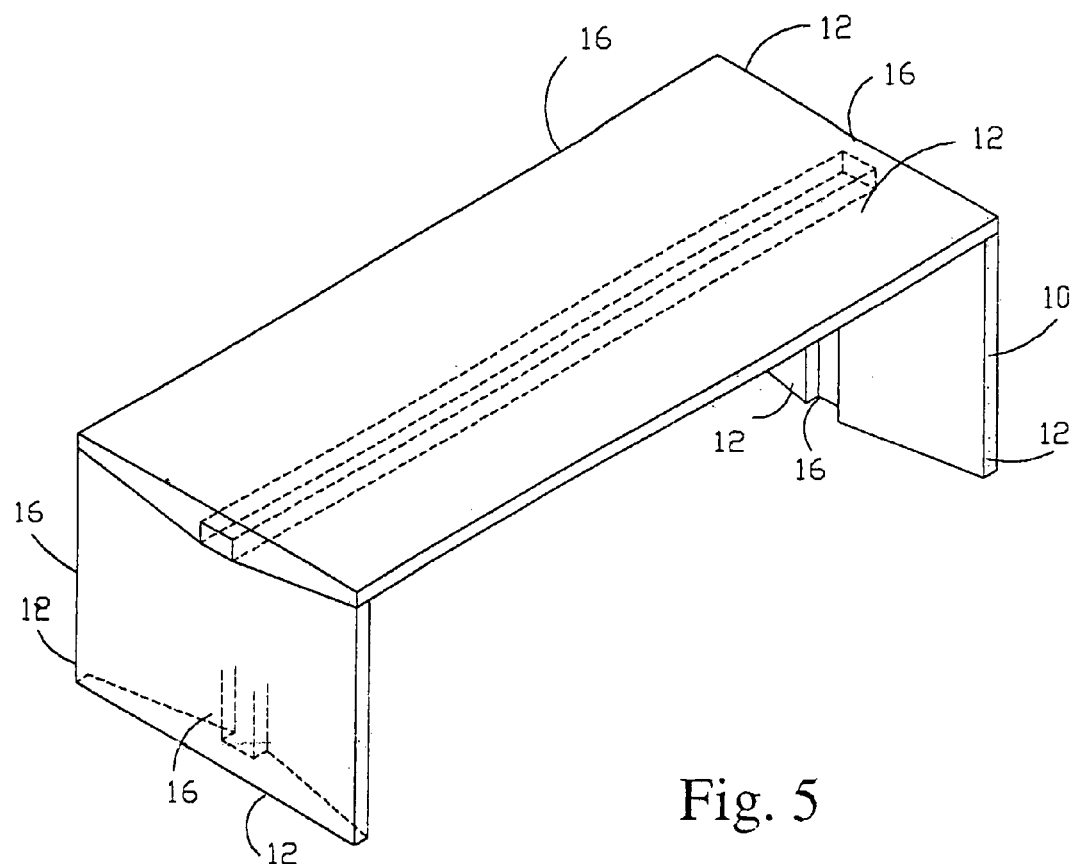
FIG. 5 is an isometric view showing several of the light distribution systems of FIG. 1 assembled to form a table.
Figure 6:
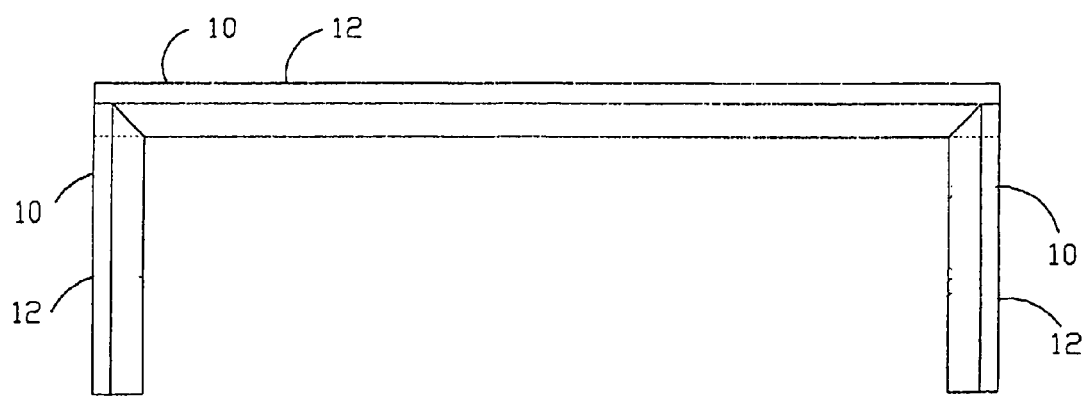
FIG. 6 is a side view of the table of FIG. 5.

In that form of the present invention chosen for illustration, FIG. 1 shows a light distribution system, indicated generally at 10, having a pair of lens panels 12 and 14 containing a light cartridge 16. As best seen in FIGS. 1 and 2, the lens panels 12 and 14 each have a generally rectangular base portion 13 with a front surface 18, extending outwardly from the upper edge 15 of the base portion 13, which serves to transmit the light and a rear surface 20, inclining upwardly from the lower edge 17 of the base portion 13, which is darkened, granulated, coated, sprayed or mirrored to reflect and modify the light directed toward the front surface 18. As seen in FIG. 1, the lens panels 12 and 14 are attached in opposing relation. However, it will be understood that the lens panels 12 and 14 may be from integral with each other or may be attached at right angles to each other or in substantially any desired relation, as seen in FIGS. 5 and 6, The light cartridge 16 is inserted into a recess 19 formed in the lens panels 12 and 14 and serves to transmit light into the lens panels 12 and 14. If desired, the lens panels 12 and 14 may share a recess 19 and have a single light cartridge 16 illuminating both lens panels 12 and 14 or each lens panel 12, as seen in FIGS. 1 and 2, or the lens panels 12 and 14 may be formed separate with each having its own recess 19 and separate light cartridges 16 may be provided for each of the lens panels 12 and 14. As seen in dotted lines in FIGS. 1 and 2. The light cartridge 16 may extend the entire length of the lens panels 12 and 14, as seen in solid lines in FIGS. 1 and 2 or may be relatively compact and project only a short distance into the lens lanels 12 and 14, as seen in dotted lines in FIGS. 1 and 2. Also, the light cartridge 16 contain a suitable light source 9, such as a fluorescent bulb, neon, mercury or sodium gas tube, laser, etc. and may be supplied with electrical energy from an outside source, not shown, by means of cable 36. Alternatively, cable 36 may be a device for transmitting non-electric energy, such as light or sonic energy. If desired, a suitable control device 38 may be housed within the light cartridge 16 to monitor and control the light source 9. For example, cable 36 could carry electrical energy from a generator or other external power source, not shown, and control device 38 could be a power supply which receives the energy from cable 36 and converts it to a form needed to energize the light source 32. Alternatively, cable 36 could be a fiber optic cable or laser carrying light from an external solar or artificial light source which could be supplied to the control device 38, which may include suitable light modifying means, such as mirrors, lenses, filters, LEDs, image projection means and the like to control the light sources 32. When this is done, the light panels 12 and 14 and light cartridge 16 can be located safely under water or in an explosive atmosphere, since no electricity is required. Also, if desired filters can be included in the light modifying means 38 to control the amount of infrared radiation delivered through the light panels 12 and 14 and, hence, can be used to control the temperature of the environment of the light panels 12 and 14. Alternatively light modifying means 38 could include means such as a photomultiplier and photoelectric cell, to convert the light energy to electrical energy for powering conventional electrical devices, such as furnaces, driers, motors and the like, not shown. Also, if desired light modifying means 38 could include suitable lenses or filters interposed between the light cartridge 16 and the lens panels 12 and 14 to modify the color, frequency or other characteristics of the light transmitted from the light cartridge 16 to the lens panels 12 and 14. Again, if desired, the light modifying means 38 could include means for projecting television pictures and the like through the light panels 12 and 14. Furthermore, it will be seen that the lens panels 12 and 14 may be made solid, as shown by lens panel 12, or may be formed with a central opening 40, as seen in lens panel 14. The opening 40 could be filled with a light-enhancing gas, such as neon, mercury or sodium, which will respond to light from light cartridge 16 and will amplify the amount of light transmitted by the hollow lens panel 14. In addition, other uses of the hollow lens panels will be discussed below. Furthermore, as seen in FIG. 3, the front surface 18 of the lens panel 12 or 14 may, if desired, be carved, frosted, etched, embossed, painted or have material applied thereto, as indicated at 42 in FIG. 3, to form lettering, designs or to otherwise modify the texture of the light transmitted from surface 18 and, if desired, the front surface 18 may be made concave or convex to focus or diffuse the light from the lens panel 12 or 14 or may be sculpted or otherwise formed, as seen at 22 in FIG. 3A.

Figure 4:
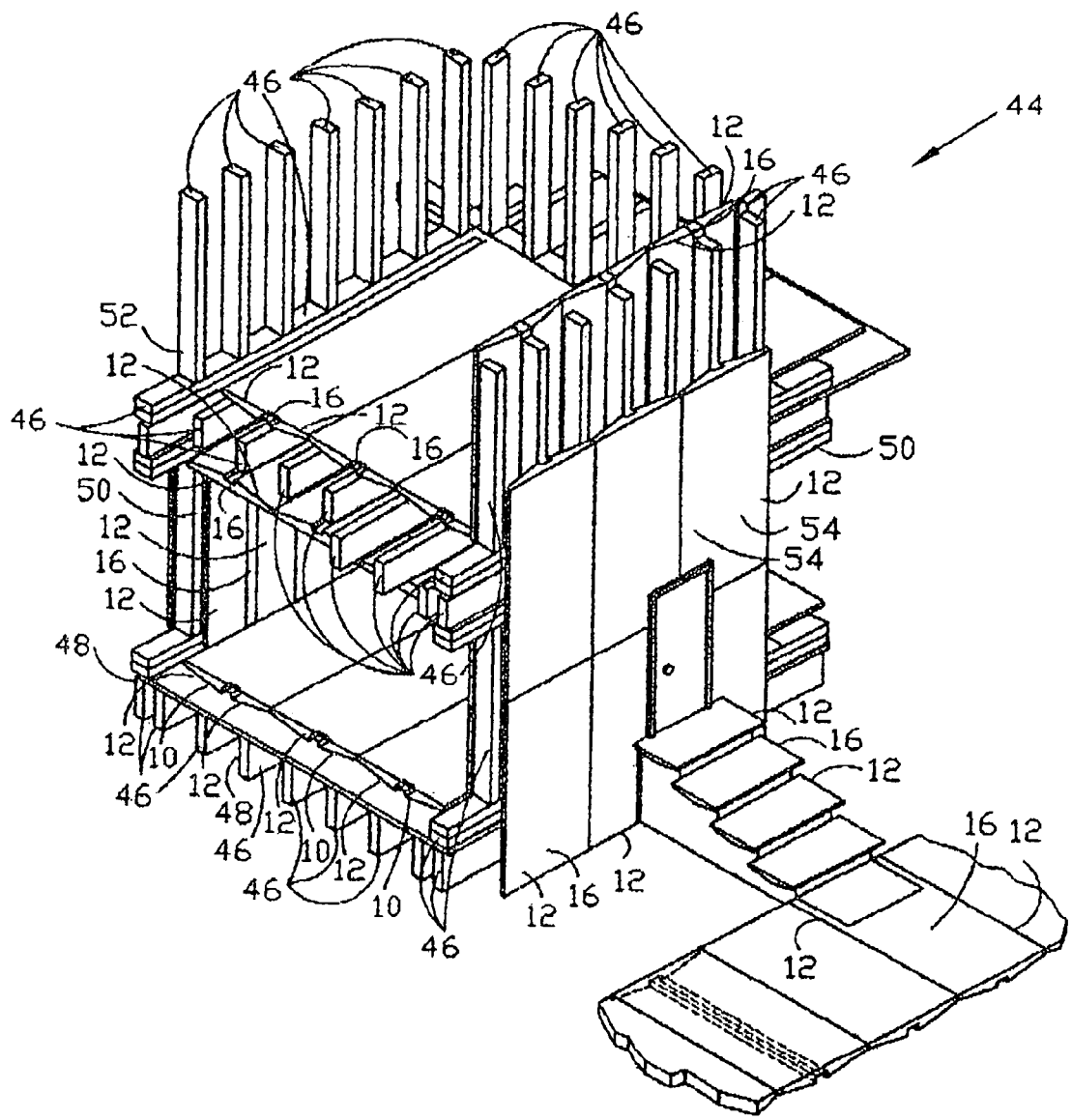
FIG. 4 is a diagrammatic view, partly in section, showing an installation embodying the light distribution system of FIG. 1.

In use, FIG. 4. shows a building, indicated generally at 44 having framing studs 46 with a plurality of the light distribution devices 10 mounted on the studs 46 to serve as floor, wall and ceiling panels, as seen at 48, 50 and 52, respectively, to provide unique interior lighting and decoration concepts. If the lens panels 12 and 14 are energized, by a fiberoptic light pipe or the like, it is possible to project images internally of the lens panels 12 and 14 which can be viewed by people in the room. Obviously, the light pipe could receive energy from solar panels or the like, which makes the light distribution system of FIG. 4 especially useful in space stations, space ships and the like. Also, the non-electric energy delivery means may, if desired, generate no heat and electricity. Consequently, the light distribution system described above, can be used for temperature regulation, as well as providing light, and can be used safely underwater or in explosive atmospheres. Additional light distribution devices 10 can be mounted to form an exterior wall, as seen at 54, to provide a lighted facade for the building 44. Other light distribution devices 10 can be embedded in the ground to serve as sections of sidewalks or streets, as seen at 56, to provide additional exterior lighting and to provide safety and security for pedestrians and motorists.

Figure 7:
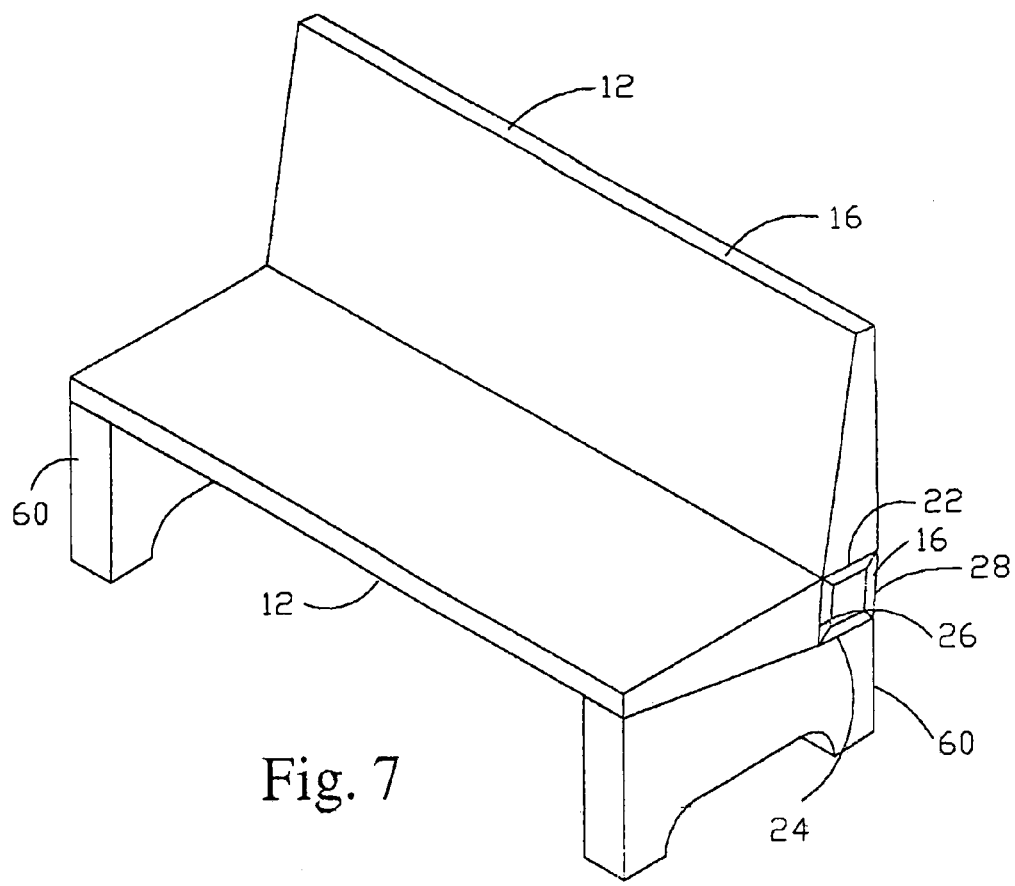
FIG. 7 is side view of an alternative form of the light distribution system of FIG. 1.

FIGS. 5 and 6 show a plurality of the light distribution devices 10 assembled together to form a table, with one pair of lens panels 12 and 14 attached in opposing relation to form the top of the table, while other pairs of lens panels 12 and 14 are connected beneath these, at angles to each other, to form the table legs. FIG. 7 shows a light distribution device 10 mounted assembled on suitable legs 60 to form an illuminated couch. In this instance, a pair of lens panels 12 and 14 are attached, substantially at right angles, to form the seat and back of the couch. It should also be understood that the light distribution system 10 could be miniturized to permit applications in microdevices and the like.

Figure 8:
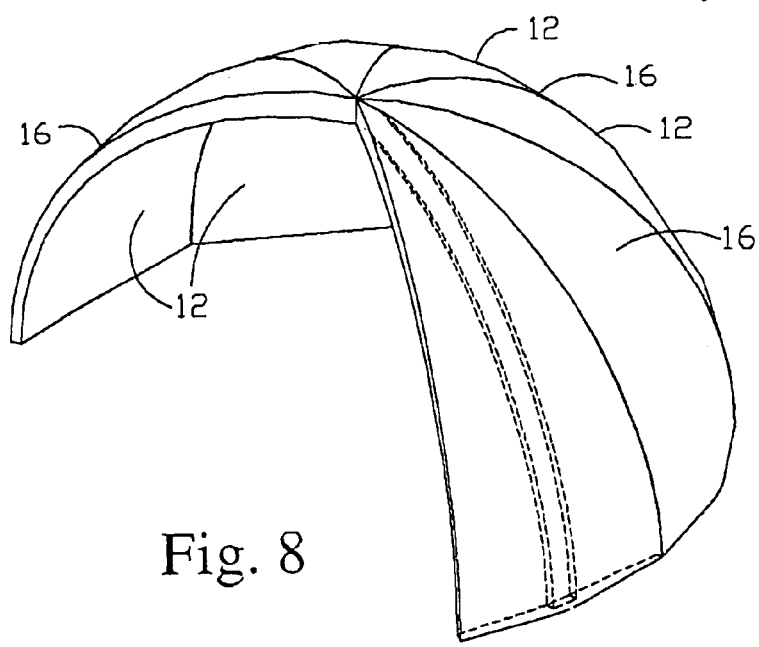
FIG. 8 is a side view of another alternative form of the light distribution device of FIG. 1.

FIG. 8. Shows an alternative form of the light distribution device 10 wherein the lens panels 12 are generally arcuate and triangular in shape. It will be seen that this form of the light distribution device 10 can be used to form lighted domes for buildings or the like.

1. In another use of the light distribution device 10, as seen in FIG. 1, light control device 38 may include a filter interposed between the light cartridge 16 and the hollow lens member 14 to allow only ultraviolet light to be delivered to the lens panel 14 and water or sewage can be passed through the opening 40 to be purified by exposure to the ultraviolet light of lens panel 14.

Obviously numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A light distribution device comprising:
a pair of light transmitting lens panels joined to form an integral unit having a common base portion, each of said lens panels having a geometric base, having a first and a second edge a front surface extending outwardly from said first edge of said base and a rear surface extending outward from the said second edge of said base and inclining toward said front surface,
a recess formed adjacent the base of at least one of said lens panels, and
a light cartridge mounted within said recess in a manner to transmit light through said lens panels and to allow said panels to be assembled with said bases in abutting relation with an adjacent surface.

2. The device of claim 1 wherein:
said base is rectangular.

3. The device of claim 1 wherein:
said base is triangular.

4. The device of claim 1 wherein:
said rear surface is mirrored.

5. The device of claim 1 wherein:
said rear surface is darkened.

6. The device of claim 1 wherein:
said rear surface is granulated.

7. The device of claim 1 wherein:
said rear surface is coated.

8. The device of claim 1 further comprising:
means external to said light distribution device delivering energy to said light cartridge.

9. The device of claim 8 wherein:
said external means supplies electrical energy to said cartridge.

10. The device of claim 8 wherein:
said external device supplies non-electric energy to said cartridge.

11. The device of claim 8 wherein:
said external device supplies optical energy to said cartridge.

12. The device of claim 8 wherein:
said light cartridge contains a light source and said delivering means is an electrical cable.

13. The device of claim 8 wherein:
said delivering means is a light pipe.

14. The device of claim 8 wherein:
said delivering means is a laser.

15. The device of claim 1 further comprising:
means for controlling the amount of infrared radiation emitted by said light panels.

16. The device of claim 1 wherein:
said front surface is flat.

17. The device of claim 1 wherein:
said front surface is carved.

18. The device of claim 1 wherein:
said front surface is textured.

19. The device of claim 1 wherein:
said front surface is etched.

20. The device of claim 1 wherein:
said front surface is sculpted.

21. The device of claim 1 wherein:
said front surface has material applied thereto to form letters.

22. The device of claim 1 wherein:
said front surface has material applied thereto to modify the light 2 transmitted from said front surface.

23. The device of claim 1 wherein:
at least one of said lens panels contains a hollow portion.

24. The device of claim 23 wherein:
said hollow portion of said lens panel is filled with fluid.

25. The device of claim 1 wherein:
said light cartridge contains means for projecting television-like signals onto said front surface of said light panel.

26. The device of claim 1 comprising:
at least two of said lens panels having their bases attached and extending outwardly from said bases in opposing relation.

27. The device of claim 1 comprising:
at least two of said lens panels having their bases attached and extending outwardly from said bases with said front surfaces defining an angle to each other.

28. The device of claim 1 wherein:
said cartridge includes light modifying means.

29. The device of claim 28 wherein:
said light modifying means is a photomultiplier.

30. The device of claim 28 wherein:
said light modifying means is a filter.

31. The device of claim 30 wherein:
said filter serves to control the amount of infrared light passed to said light panels.

32. The device of claim 28 wherein:
said cartridge contains a filter to pass only desired light frequencies to said lens panel, and
a substance to be purified by said ultraviolet light is passed through said hollow portion of said lens panel.

33. The device of claim 28 wherein;
said light modifying means projects images into said lens panel.

34. The device of claim 33 wherein:
said light modifying means is a television projection system.

35. The device of claim 1 wherein:
said device is mounted on the framing studs of a building to form a floor panel for a room within said building.

36. The device of claim 1 wherein:
said device is mounted on the framing studs of a building to form a wall panel for a room within said building.

37. The device of claim 1 wherein:
said device is mounted on the framing studs of a building to form a ceiling panel for a room within said building.

38. The device of claim 1 wherein:
said device is embedded in the ground to form a section of a sidewalk.

39. The device of claim 1 wherein:
said device is embedded in the ground to form a section of a road.

40. The device of claim 1 wherein:
said lens panel is arcuate.

41. The device of claim 1 wherein:
said device is mounted under water.

42. The device of claim 1 wherein:
said device is mounted in an explosive atmosphere.

43. The device of claim 1 wherein:
said device serves to affect the temperature of the surrounding area.

44. The device of claim 1 wherein:
said device serves as a sign.

45. An article of furniture comprising:
at least one light distribution device having a pair of light transmitting lens panels having a base having first and a second edge, a front surface extending outwardly from said first edge of said base and a rear surface extending outwardly from the second edge of said base and inclining toward said front surface, and one of said lens panels formed with a recess adjacent said base, and
a light cartridge mounted adjacent said base to transmit light 9 through said lens panel.

46. A light-emitting structure including:
at least two lens panels, each of said lens panels comprising:
a geometric base having a first and a second edge, a front surface extending outwardly from one edge of said base and a rear surface extending outward from the opposite edge of said base and inclining toward said front surface; said lens panels being mounted in base to base relation; and
a light cartridge connecting said bases and serving to deliver light through said lens panels.

47. A structure comprising at least one light-emitting panel as a structural component thereof, said panel comprising a base having a first and a second edge, a front surface extending outwardly from said first edge of said base and a rear surface extending outward from the said second edge of said base and inclining toward said front surface,
a recess formed adjacent the base of at least one of said lens panels, and
a light cartridge mounted within said recess.

48. The structure of claim 47 wherein:
said structure is a piece of furniture.

49. The structure of claim 47 wherein:
said structure is a vehicle-bearing surface.

50. The structure of claim 47 wherein:
said light-emitting panel is hollow, and having a means for supplying fluid through said panel.

51. The structure of claim 47 wherein:
said structure is a sidewalk.

52. The structure of claim 51 wherein:
said light-emitting panel is hollow, and having a
means for supplying hot fluid through said panel.

53. The structure of claim 47 wherein:
said structure has an interior wall and said light-emitting panel forms a structural component of said interior wall.

54. The structure of claim 47 wherein:
said structure has an exterior wall and said light-emitting panel forms a structural component of said exterior wall.

55. The structure of claim 47 wherein:
said structure includes an architectural dome and said light-emitting panel forms a structural component of said dome.

56. The structure of claim 47 wherein:
said structure is hollow and includes means for passing a fluid through said panel, and
means for passing ultraviolet light through said panel to treat said fluid.

* * * * *